(12) United States Patent
Mohseni et al.

(10) Patent No.: US 11,428,281 B2
(45) Date of Patent: Aug. 30, 2022

(54) BRAKE PAD WITH SURFACE COATING

(71) Applicant: Robert Bosch GmbH, Stuttgart (DE)

(72) Inventors: Hamidreza Mohseni, Naperville, IL (US); Mark Phipps, Wayne, IL (US)

(73) Assignees: Robert Bosch LLC, Broadview, IL (US); Robert Bosch GmbH, Stuttgart (DE)

(*) Notice: Subject to any disclaimer, the term of this patent is extended or adjusted under 35 U.S.C. 154(b) by 214 days.

(21) Appl. No.: 16/555,225

(22) Filed: Aug. 29, 2019

(65) Prior Publication Data

US 2021/0062877 A1  Mar. 4, 2021

(51) Int. Cl.
| | |
|---|---|
| *F16D 65/092* | (2006.01) |
| *F16D 69/04* | (2006.01) |
| *F16D 69/02* | (2006.01) |
| *B32B 7/12* | (2006.01) |
| *B32B 9/00* | (2006.01) |
| *F16D 69/00* | (2006.01) |

(52) U.S. Cl.
CPC .............. *F16D 65/092* (2013.01); *B32B 7/12* (2013.01); *B32B 9/005* (2013.01); *F16D 69/027* (2013.01); *F16D 69/0408* (2013.01); *B32B 2307/744* (2013.01); *B32B 2605/00* (2013.01); *F16D 2069/005* (2013.01); *F16D 2069/0475* (2013.01); *F16D 2200/0043* (2013.01); *F16D 2200/0078* (2013.01); *F16D 2250/0023* (2013.01)

(58) Field of Classification Search
CPC .............. F16D 69/027; F16D 69/0408; F16D 2069/0475; F16D 2069/005; F16D 2250/0023; F16D 2250/02; F16D 2250/44; F16D 2200/0043; B32B 27/06; B32B 9/04; B32B 7/12; B32B 2307/744; B32B 2255/26; B32B 2255/20; B32B 2255/10

See application file for complete search history.

(56) References Cited

U.S. PATENT DOCUMENTS

| | | | | |
|---|---|---|---|---|
| 2,851,132 | A * | 9/1958 | James | F16D 65/82 188/264 R |
| 5,622,785 | A * | 4/1997 | Gaylor | F16D 65/092 508/108 |
| 6,109,399 | A * | 8/2000 | Crawford | B62L 1/06 188/24.11 |
| 6,585,089 | B1 * | 7/2003 | Parker | F16D 65/092 188/218 XL |
| 8,960,378 | B2 * | 2/2015 | Moore | F16D 69/02 188/24.12 |
| 2010/0084233 | A1 * | 4/2010 | Subramanian | F16D 69/026 188/251 A |
| 2011/0272222 | A1 * | 11/2011 | Heffelfinger | F16D 65/0037 188/251 A |
| 2011/0297496 | A1 * | 12/2011 | Subramanian | F16D 69/026 188/251 A |

(Continued)

*Primary Examiner* — Robert A. Siconolfi
*Assistant Examiner* — San M Aung
(74) *Attorney, Agent, or Firm* — David Kovacek; Maginot, Moore & Beck LLP

(57) ABSTRACT

A brake pad having a surface coating operable to enhance the bedding-in process during normal operation. The surface coating may be formulated using one or more materials found in a friction lining of the brake pad. The surface coating may be formulated using only non-metal materials.

20 Claims, 6 Drawing Sheets

(56) References Cited

U.S. PATENT DOCUMENTS

2014/0174319 A1\* 6/2014 Yamamoto .............. F16D 69/02
106/36
2015/0369312 A1\* 12/2015 Inokuchi ............. F16D 69/0408
188/72.4

\* cited by examiner

BRAKE PAD WITH SURFACE COATING

TECHNICAL FIELD

This disclosure relates to brake pads and the assembly of brake pads.

BACKGROUND

Brake pads used in motor vehicles undergo a "bedding-in" process that involves a gradual deposition of friction material onto the surface of the brake rotor. After the bedding-in process, brake pads behave more efficiently and more smoothly transfer braking power.

However, the bedding-in process is time-consuming and may require slow and deliberate operation for newly installed brakes to be most effective. Current brake systems may suffer rapid heat build-up if the brakes are applied before or during the bedding-in process, which may cause damage to the brake rotor from warping. The brake pads themselves may suffer from a "glazing" of the surface material if exposed to excessive heat build-up, reducing the efficiency of the brakes and diminishing the operational lifespan of the brake pad.

SUMMARY

One aspect of this disclosure is directed to a brake pad comprising a backing plate having a mounting surface, a friction lining having a tribological surface, and a surface coating applied to a portion of the tribological surface. The tribological surface may be arranged in parallel to the mounting surface. The surface coating may be affixed to the tribological surface using an adhesive. The surface coating may have a predetermined design that can create a visual effect on the tribological surface. The surface coating may comprise a composite material, the composite material being formulated using one or more potassium-titanates.

Another aspect of this disclosure is directed to a brake pad comprising a backing plate having a mounting surface, a friction lining having a tribological surface, and a surface coating applied to a portion of the tribological surface. The tribological surface may be arranged in parallel to the mounting surface. The surface coating may be affixed to the tribological surface using an adhesive. The surface coating may have a predetermined design that can create a visual effect on the tribological surface. The surface coating may comprise a composite material, the composite material being formulated using only non-metal materials.

The above aspects of this disclosure and other aspects will be explained in greater detail below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
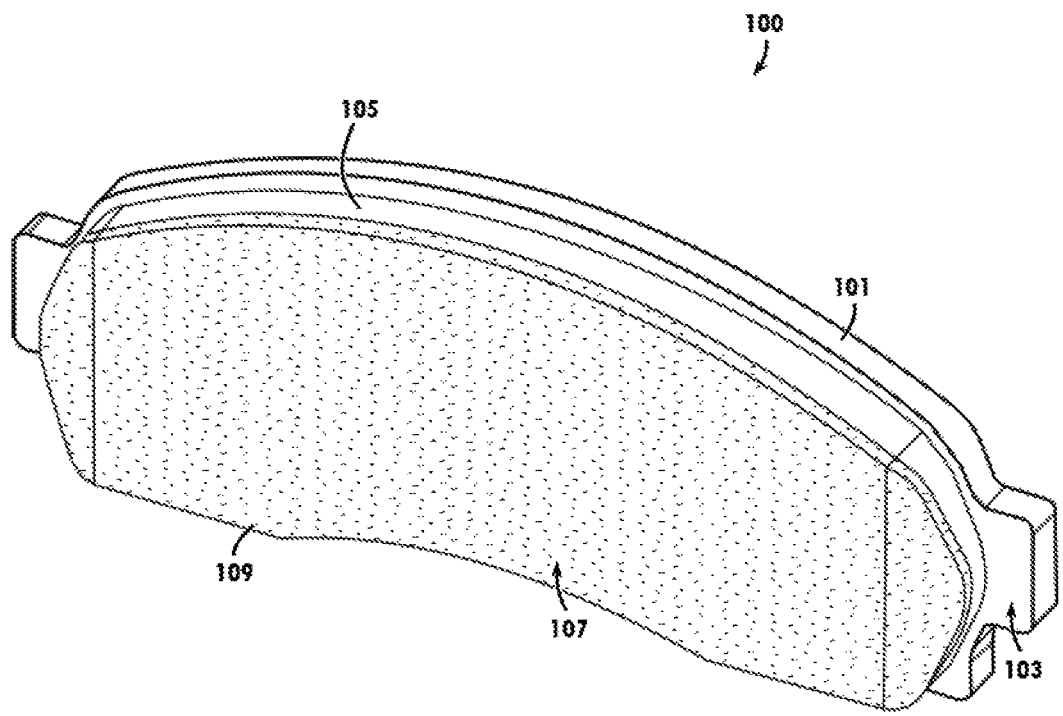
FIG. 1 is an illustration of a brake pad having a surface coating.

FIG. 1 shows a brake pad 100 according to one embodiment of the teachings herein. Brake pad 100 comprises a backing plate 101 having a mounting surface 103. Mounting surface 103 may be suitable to provide a coupling surface between backing plate 101 and a friction lining 105. Friction lining 105 may be operable to apply friction forces to a braking rotor, thus creating braking power for a vehicle. Friction forces of friction lining 105 are transferred via a tribological surface 107, which is substantially parallel to the mounting surface 103 within a specified tolerance. The formulation of friction lining 105 may be suited to a particular vehicle type, brake design, brake rotor type, or any combination thereof without deviating from the teachings disclosed herein.

During normal braking operations, friction lining 105 wears away, and may leave residual material on the surface of a drum rotor during a bedding-in period of operation. This residual material is known as a "transfer layer" and a properly developed transfer layer can improve the efficiency of braking, the smoothness of the braking force application, and the operable lifespan of the brake pad. Until the bedding-in is completed, the brakes may operate at sub-optimal performance.

The transfer layer also reduces heat buildup during braking, which may prevent damage to the brake rotor or detrimental effects of heat on the friction lining. However, because friction lining 105 is formulated to resist wear, the bedding-in may take longer than is desired. For this reason, brake pad 100 comprises a surface coating 109 applied to the tribological surface 107 of friction lining 105.

Surface coating 109 may advantageously be formulated to readily create a transfer layer having characteristics similar to that of friction lining 105, except forming more rapidly under normal use. The transfer layer generated by surface coating 109 may exhibit friction characteristics similar to a transfer layer generated by friction lining 105 within specified tolerances, except the transfer layer may be generated at substantially lower levels of heat and substantially less braking cycles than friction lining 105 alone. As a result, the brake rotor may be protected from heat-related warping, and friction lining 105 may be protected from adverse conditions cause by heat buildup during the bedding-in. In some previous designs, bedding-in may require 300-400 miles of operation, but adding surface coating 109 may advantageously reduce the necessary operation to complete the bedding-in. The formulation of surface coating 109 may be suited to a particular vehicle type, brake design, brake rotor type, friction lining formulation, or any combination thereof without deviating from the teachings disclosed herein.

Braking performance may be improved during the bedding-in process based upon the formulation of friction lining 105 and surface coating 109. In some embodiments, friction lining 105 may comprise a first composite material, and surface coating 109 may comprise a second composite material having some of the same components as friction lining 105. In some embodiments, a formulation of surface coating 109 having some components as friction lining 105 may improve braking function or the effective lifespan of the brake pad.

Surface coating 109 formulations may utilize a number of materials. In some embodiments, surface coating 109 may comprise a composite of non-metal materials. In some embodiments, surface coating 109 may comprise composites of materials such as titanates, lubricants, abrasives, fillers, fibers, binders, or pH modifiers. By way of example, and not limitation, titanates in the composite may comprise potassium titanate, sodium titanate, and potassium magnesium. By way of example, and not limitation, lubricants in the composite may comprise antimony trisulphide, tin sulphide, or zinc sulphide. By way of example, and not limitation, abrasives in the composite may comprise zircon, zirconia, alumina, magnetite or mullite. By way of example, and not limitation, fillers in the composite may comprise barytes, mica, ceramic shot, or mineral shot. By way of example, and not limitation, fibers in the composite may comprise ceramic fibers, mineral fibers, or basalt fibers. By way of example, and not limitation, binders in the composite may comprise inorganic resin, organic resin, sodium silicate, or poly-blend non-sanded grout. By way of example, and not limitation, pH modifiers in the composite may comprise lime or pot ash. Other materials may be used one or more categories without deviating from the teachings disclosed herein.

In some embodiments, different forms of materials may be utilized, such as two or more distinct potassium titanates, without deviating from the teachings disclosed herein. Compositions of surface coating 109 may vary slightly in their respective component inclusions without deviating from the teachings disclosed herein. For example, one composition may comprise 70-80% resin, 10-20% zirconia, 2.5-12.5% potassium titanate, and 0-5% antimony trisulfide by weight. In another example embodiment, a composition may comprise 47-57% sodium silicate, 16-26% zirconia, 16-26% barytes, 0-5% Antimony trisulfide, and 0-5% magnetite. In yet another exampled embodiment, a composition may comprise 20-30% poly-blend non-sanded grout, 15-25% zirconia, 15-20% barytes, 0-5% antimony trisulfide, 05% magnetite, and up to 30% water.

Some embodiments may comprise composites having up to 40% zirconia, up to 20% zircon, up to 10% potassium titanate, up to 20% barytes, up to 5% ceramic fibers, up to 5% $Sb_2S_3$, up to 5% $SnS_2$, up to 5% mica, or some combination of the above ingredients in the listed quantities without deviating from the teachings disclosed herein. In some embodiments, resin may be utilized to balance the composition if the other ingredients do not yield a mixture of 100% without deviating from the teachings disclosed herein. Other embodiments may comprise other compositions without deviating from the teachings disclosed herein.

Surface coating 109 may be applied to friction lining 105 using an adhesive. The adhesive may be formulated for a specified curing time that is suitably long for a complete application, but sufficiently short that addition of a surface coating to brake pad 100 has a minimized impact on manufacturing and production times. In some embodiments, curing times may be 180 seconds or less. In some embodiments, curing times may be 60 seconds or less. In some embodiments, commercially-available adhesives may be utilized, such as a quick-drying formulation. In some embodiments, the adhesive may comprise aliphatic resin or polyvinyl acetate. Other embodiments may comprise other formulations without deviating from the teachings disclosed herein.

FIG. 1 provides an illustration of a brake pad 100 having an even application of surface coating 109 to the entire area of tribological surface 107 of friction lining 105. Other embodiments may comprise different applications, which may advantageously be utilized to accommodate for different vehicle specifications. Application of surface coating 109 may be applied using a stamping operation, which is operable to accommodate a wide variety of application designs. A stamping operation may advantageously permit utilization of any arbitrary design desired during manufacturing.

In the depicted embodiment, surface coating 109 provides a distinct visual appearance to friction lining 105, making the design of the application visually identifiable. Such visual distinction may advantageously permit surface coating 109 be applied to friction lining 105 in a way that allows for branding in addition to operational advantages. Application of the surface coating 109 may utilize an arbitrary design without deviating from the teachings disclosed herein. For example, a design may be sold with a particular aesthetic or trademarked design to identify a brake pad as having been made by a particular manufacturer.

FIG. 1 depicts an embodiment wherein surface coating 109 provides complete coverage of the tribological surface 107 of friction lining 105. Other embodiments may comprise other configurations of surface coating 109. By way of example, and not limitation, some embodiments may concentrate the surface coating 109 in portions of the tribological surface 107 that are specified to make more frequent contact with a brake rotor during operation. In some embodiments, portions of tribological surface 107 that are specified to experience more friction forces during operation may feature a concentration of surface coating 109. Other embodiments may comprise other configurations without deviating from the teachings disclosed herein.

Figure 2:
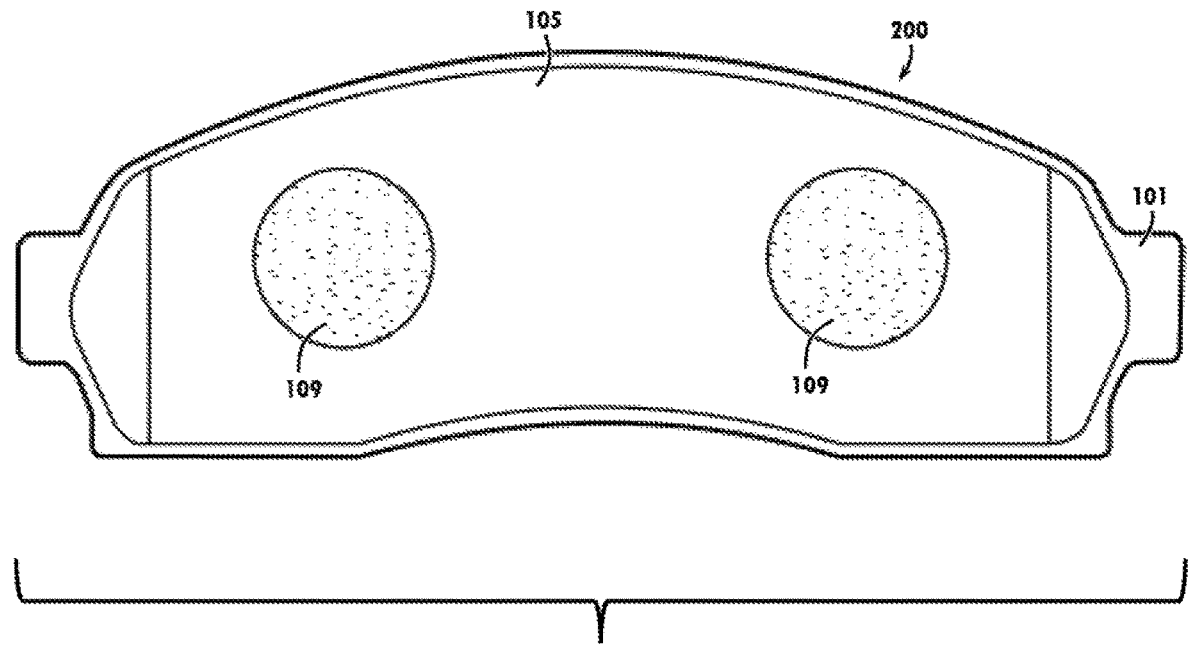
FIG. 2 is an illustration of a brake pad having a surface coating applied in a predetermined design.

FIG. 2 is an illustration of a brake pad 200 that utilizes the same backing plate 101, friction lining 105, and formulation of surface coating 109 as brake pad 100, but the application of surface coating 109 forms a pair of spaced circles. Other embodiments may comprise a different number of circles without deviating from the teachings disclosed herein. Other embodiments may comprise a number of circles having different dimensions or position with respect to friction lining 105 without deviating from the teachings disclosed herein. Other embodiments may comprise a number of elliptical shapes other than circles without deviating from the teachings disclosed herein.

Figure 3:
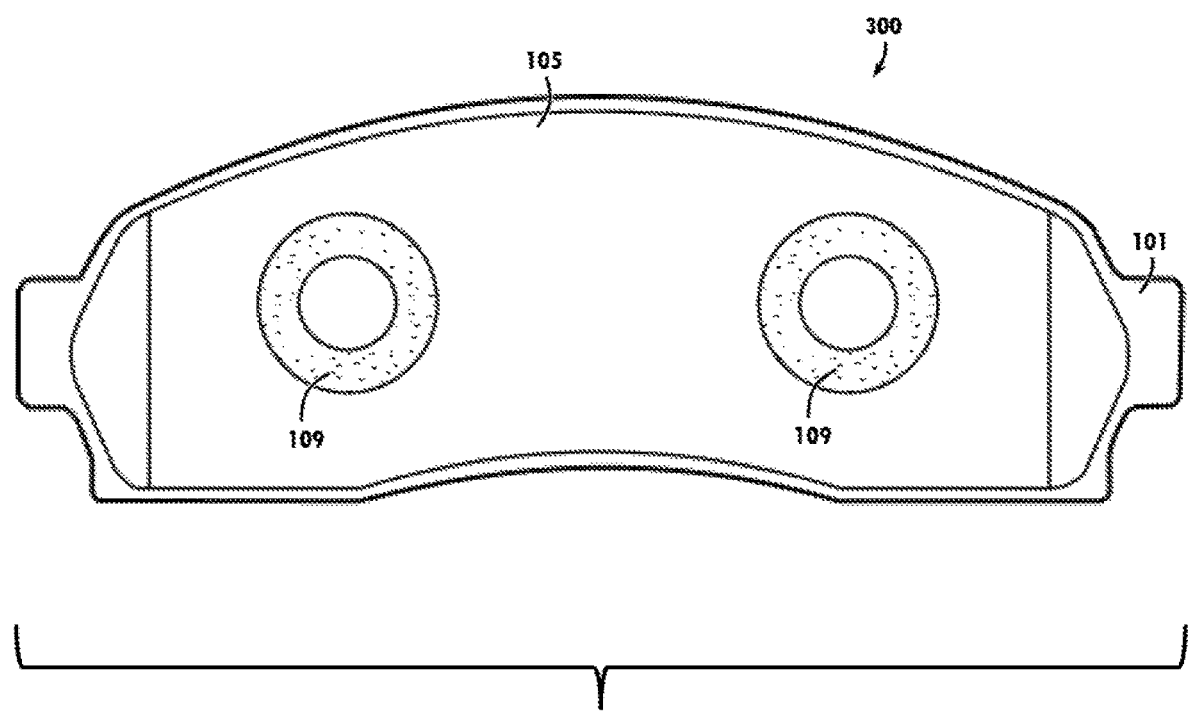
FIG. 3 is an illustration of a brake pad having a surface coating applied in a predetermined design.

FIG. 3 is an illustration of a brake pad 300 that utilizes the same backing plate 101, friction lining 105, and formulation of surface coating 109 as brake pad 100, but the application of surface coating 109 forms a pair of spaced rings. Other embodiments may comprise a different number of rings without deviating from the teachings disclosed herein. Other embodiments may comprise a number of rings having different dimensions or position with respect to friction lining 105 without deviating from the teachings disclosed herein.

Figure 4:
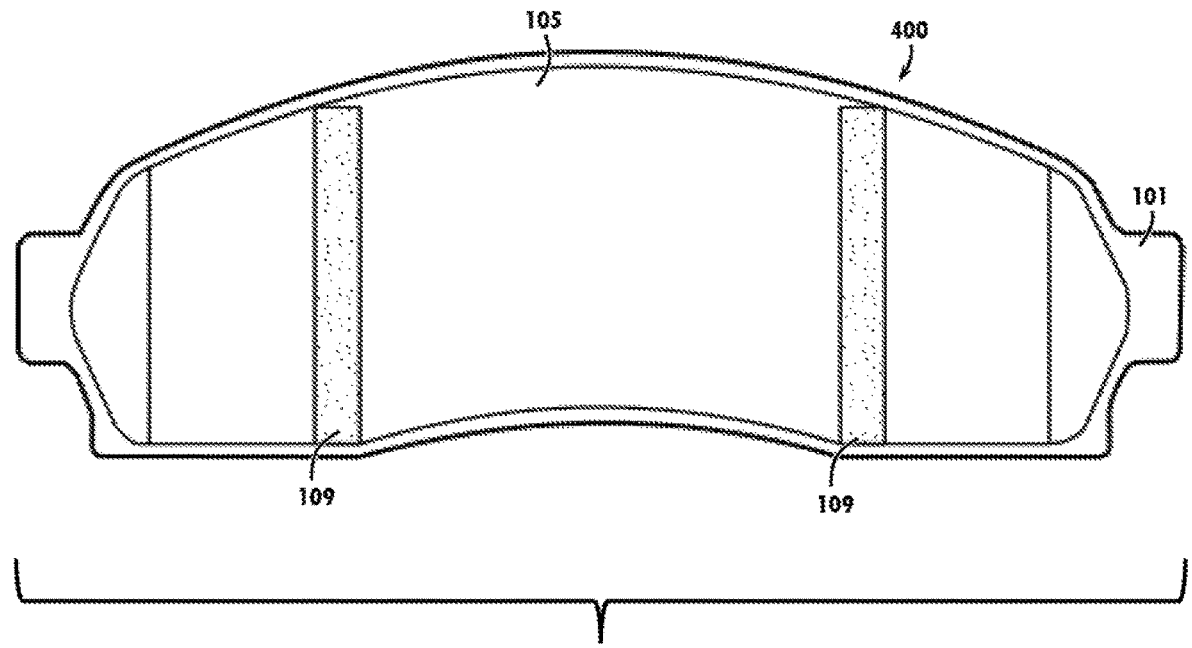
FIG. 4 is an illustration of a brake pad having a surface coating applied in a predetermined design.

FIG. 4 is an illustration of a brake pad 400 that utilizes the same backing plate 101, friction lining 105, and formulation of surface coating 109 as brake pad 100, but the application of surface coating 109 forms a pair of spaced stripes. Other embodiments may comprise a different number of stripes without deviating from the teachings disclosed herein. Other embodiments may comprise a number of stripes having different dimensions or position with respect to friction lining 105 without deviating from the teachings disclosed herein.

Figure 5:
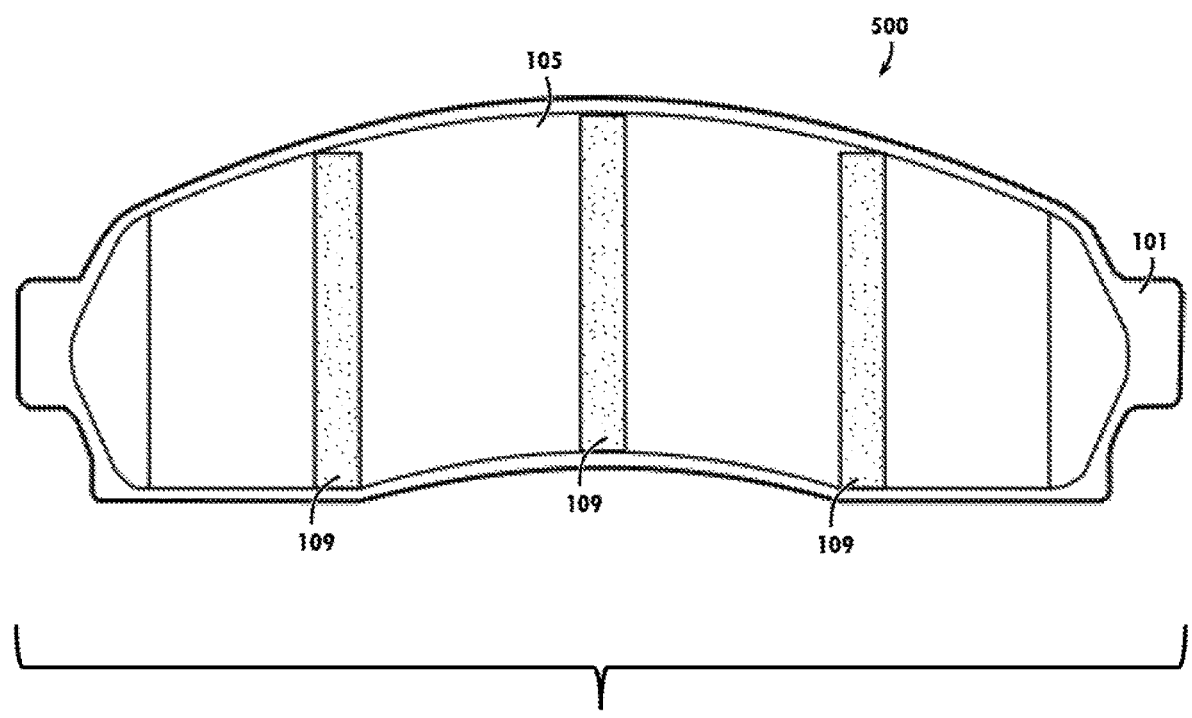
FIG. 5 is an illustration of a brake pad having a surface coating applied in a predetermined design.

FIG. 5 is an illustration of a brake pad 500 that utilizes the same backing plate 101, friction lining 105, and formulation of surface coating 109 as brake pad 100, but the application of surface coating 109 forms a trio of spaced stripes. Other embodiments may comprise a different number of stripes without deviating from the teachings disclosed herein. Other embodiments may comprise a number of stripes having different dimensions or position with respect to friction lining 105 without deviating from the teachings disclosed herein.

Figure 6:
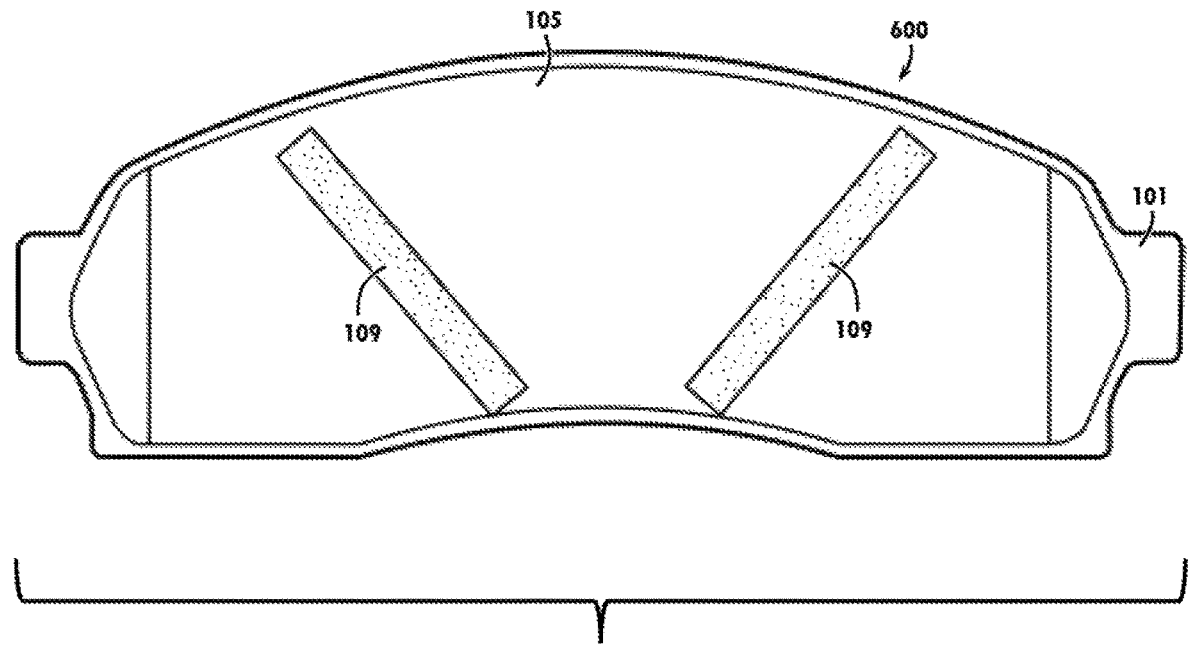
FIG. 6 is an illustration of a brake pad having a surface coating applied in a predetermined design.

FIG. 6 is an illustration of a brake pad 600 that utilizes the same backing plate 101, friction lining 105, and formulation of surface coating 109 as brake pad 100, but the application of surface coating 109 forms a pair of angled stripes. Other embodiments may comprise a different number of stripes without deviating from the teachings disclosed herein. Other embodiments may comprise a number of stripes having different dimensions or position with respect to friction lining 105 without deviating from the teachings disclosed herein.

Figure 7:
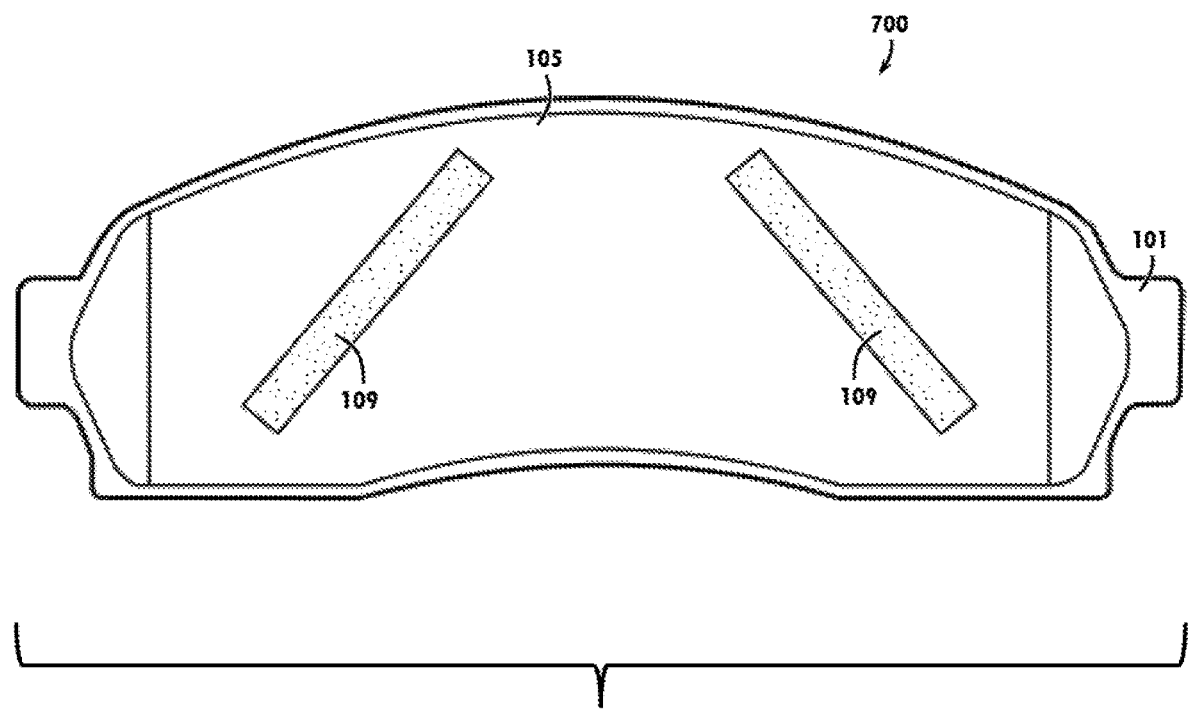
FIG. 7 is an illustration of a brake pad having a surface coating applied in a predetermined design.

FIG. 7 is an illustration of a brake pad 700 that utilizes the same backing plate 101, friction lining 105, and formulation of surface coating 109 as brake pad 100, but the application of surface coating 109 forms a pair of angled stripes. Other embodiments may comprise a different number of stripes without deviating from the teachings disclosed herein. Other embodiments may comprise a number of stripes having different dimensions or position with respect to friction lining 105 without deviating from the teachings disclosed herein.

Figure 8:
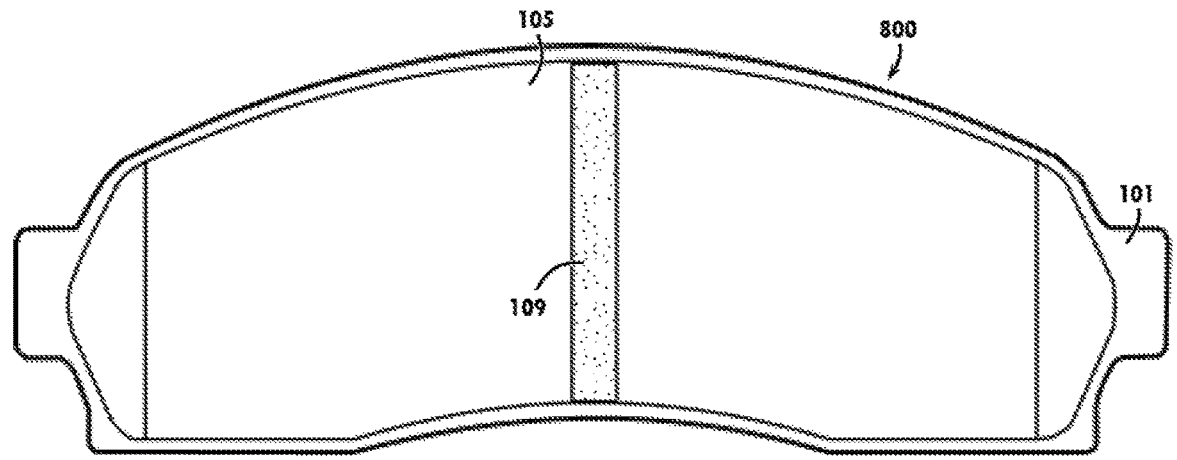
FIG. 8 is an illustration of a brake pad having a surface coating applied in a predetermined design.

FIG. 8 is an illustration of a brake pad 800 that utilizes the same backing plate 101, friction lining 105, and formulation of surface coating 109 as brake pad 100, but the application of surface coating 109 forms a stripe. Other embodiments may comprise a different number of stripes without deviating from the teachings disclosed herein. Other embodiments may comprise a number of stripes having different dimensions or position with respect to friction lining 105 without deviating from the teachings disclosed herein.

Figure 9:
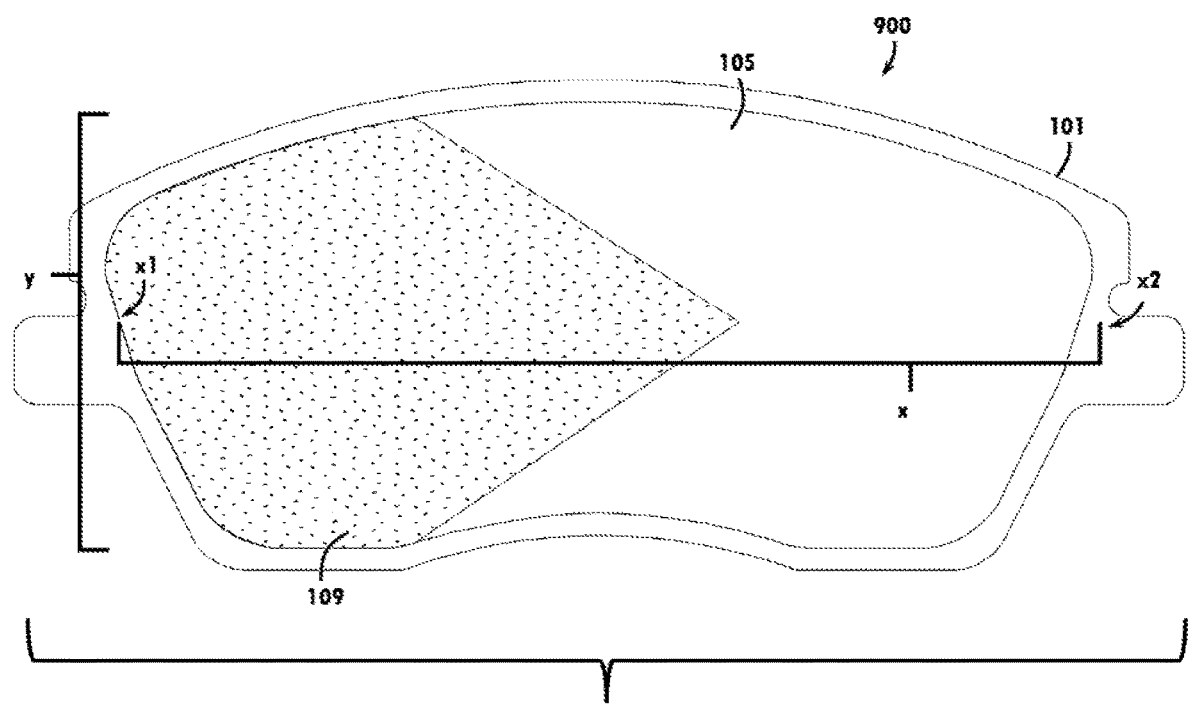
FIG. 9 is an illustration of a brake pad having a surface coating applied in a predetermined design.

FIG. 9 is an illustration of a brake pad 900 that utilizes the same backing plate 101, friction lining 105, and formulation of surface coating 109 as brake pad 100, but the application of surface coating 109 is asymmetrically applied to the tribological surface of friction lining 105. In particular, the surface coating 109 varies with respect to a position along a length x of the friction lining 105. The variation of the application in the depicted embodiment changes along length x with respect to a width y of friction lining 105. At a proximal end x1 of length x, all of the associated width y is covered by surface coating 109. At a distal end x2 of length x, none of the friction lining 105 is covered by surface coating 109 at any point along width y. The coverage of surface coating 109 with respect to width y gradually diminishes between proximal end x1 and distal end x2. In the depicted embodiment, coverage of surface coating 109 tapers linearly, but other embodiments may comprise other arrangements without deviating from the teachings disclosed herein. In some embodiments, brake pad 900 may be most-effectively utilized in a particular brake position within a vehicle. In such embodiments, brake pads may be utilized in tandem to provide effective braking on all wheels of the vehicle, with each brake pad having a specialized design suitable for its particular position when installed in the vehicle, without deviating from the teachings disclosed herein.

Figure 10:
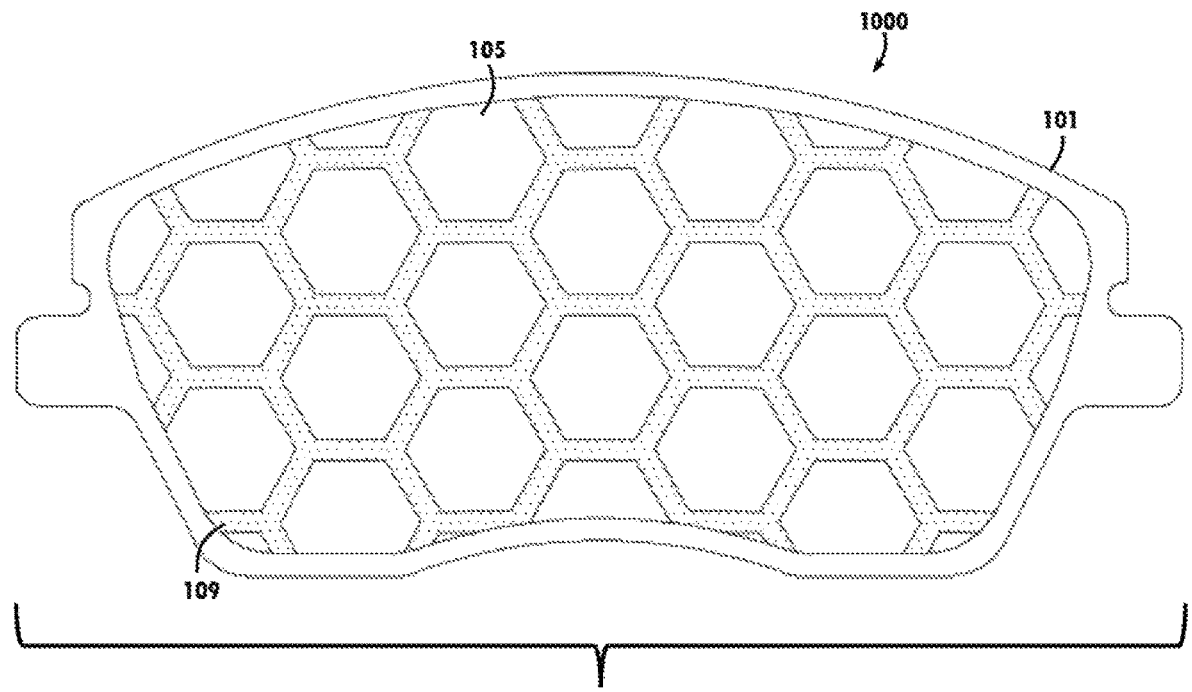
FIG. 10 is an illustration of a brake pad having a surface coating applied in a predetermined design.
Figure 11:
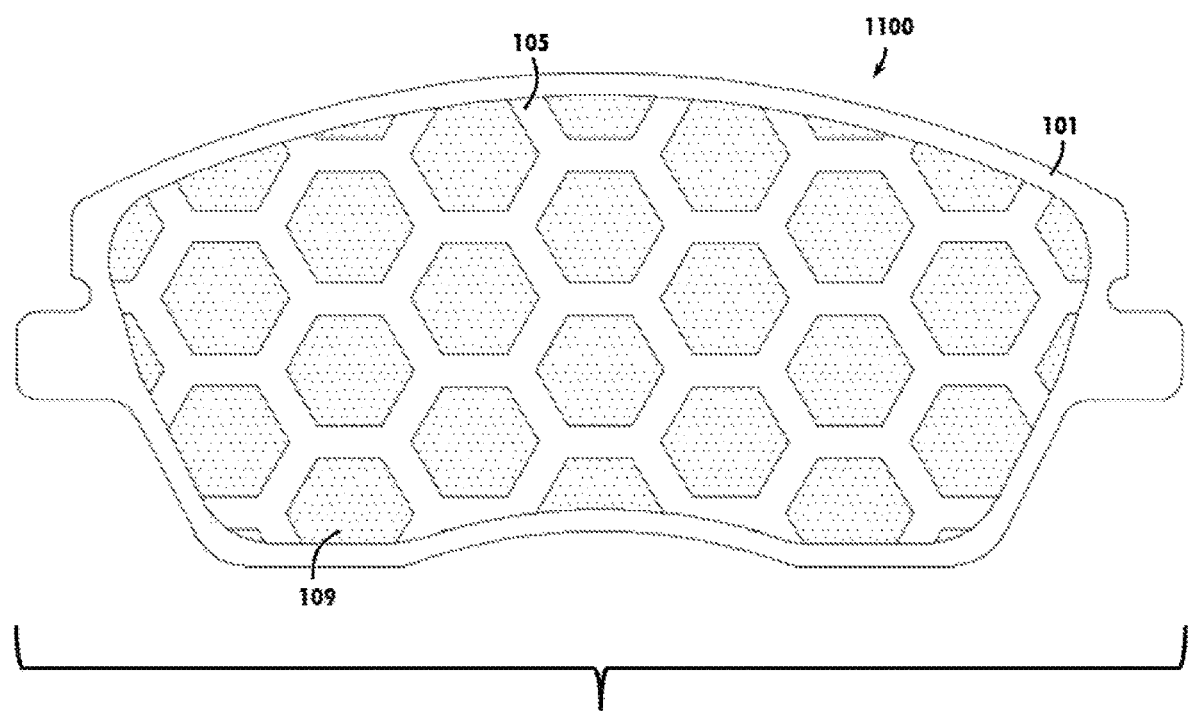
FIG. 11 is an illustration of a brake pad having a surface coating applied in a predetermined design.

In some embodiments, the application of surface coating 109 may provide for a geometric pattern. FIG. 10 is an illustration of a brake pad 1000 that utilizes the same backing plate 101, friction lining 105, and formulation of surface coating 109 as brake pad 100, but the application of surface coating 109 forms a geometric pattern comprising a grid of hexagons. FIG. 11 is an illustration of a brake pad 1100 that utilizes the same backing plate 101, friction lining 105, and formulation of surface coating 109 as brake pad 100, but the application of surface coating 109 forms a geometric pattern comprising a repeated pattern of hexagons. Other embodiments may have other designs or other embodiments without deviating from the teachings disclosed herein.

While exemplary embodiments are described above, it is not intended that these embodiments describe all possible forms of the disclosed apparatus and method. Rather, the words used in the specification are words of description rather than limitation, and it is understood that various changes may be made without departing from the spirit and scope of the disclosure as claimed. The features of various implementing embodiments may be combined to form further embodiments of the disclosed concepts.

What is claimed is:

1. A brake pad comprising:
    a backing plate having a mounting surface;
    a friction lining affixed to the mounting surface and having a tribological surface that is parallel to the mounting surface within a specified tolerance; and
    a surface coating affixed to a portion of the tribological surface using an adhesive and having a predetermined peripheral shape as viewed in a direction perpendicular to the tribological surface,
    wherein the surface coating is a composite material, the composite including a potassium titanate, and wherein the predetermined peripheral shape comprises a geometric shape asymmetrically applied to the tribological surface,
    wherein the tribological surface comprises a proximal end and a distal end opposite from the proximal end, and wherein the asymmetrical application of the predetermined peripheral shape comprises a continuous and gradual reduction in width when observed along a direction from the proximal end to the distal end.

2. The brake pad of claim 1, wherein the composite includes at least two distinct potassium titanates.

3. The brake pad of claim 1, wherein the surface coating is visually distinct from the friction lining.

4. The brake pad of claim 1, wherein the adhesive has a curing time not greater than 180 seconds within a specified tolerance.

5. The brake pad of claim 1, wherein the surface coating is affixed to the tribological surface using a stamping process.

6. The brake pad of claim 1, wherein the composite comprises only non-metal materials.

7. The brake pad of claim 1, wherein the composite comprises a material component also found in the friction lining.

8. The brake pad of claim 1, wherein the composite comprises at least two materials selected from a list including inorganic resin, organic resin, sodium silicate, polyblend non-sanded grout, zirconia, zircon, barytes, antimony trisulfide, and magnetite.

9. The brake pad of claim 1, wherein the width of the peripheral shape is 0 beyond a midpoint between the proximal end and the distal end.

10. The brake pad of claim 1, wherein the predetermined peripheral shape is localized at a portion of the tribological surface that exhibits a higher frequency of contact with a brake rotor during operation.

11. A brake pad comprising:
- a backing plate having a mounting surface;
- a friction lining affixed to the mounting surface and having a tribological surface that is parallel to the mounting surface within a specified tolerance; and
- a surface coating affixed to a portion of the tribological surface using an adhesive and having a predetermined peripheral shape as viewed in a direction perpendicular to the tribological surface,
- wherein the surface coating is a composite material, the composite comprising only non-metal materials, and wherein the predetermined peripheral shape comprises a geometric shape asymmetrically applied to the tribological surface,
- wherein the tribological surface comprises a proximal end and a distal end opposite from the proximal end, and wherein the asymmetrical application of the predetermined peripheral shape comprises a continuous and gradual reduction in width when observed along a direction from the proximal end to the distal end.

12. The brake pad of claim 11, wherein the composite includes a potassium titanate.

13. The brake pad of claim 12, wherein the composite includes at least two distinct potassium titanates.

14. The brake pad of claim 11, wherein the surface coating is visually distinct from the friction lining.

15. The brake pad of claim 11, wherein the adhesive has a specified curing time not greater than 180 seconds within a specified tolerance.

16. The brake pad of claim 11, wherein the surface coating is affixed to the tribological surface using a stamping process.

17. The brake pad of claim 11, wherein the composite comprises a material component also found in the friction lining.

18. The brake pad of claim 11, wherein the width of the peripheral shape is 0 beyond a midpoint between the proximal end and the distal end.

19. The brake pad of claim 11, wherein the predetermined peripheral shape is localized at a portion of the tribological surface that exhibits a higher frequency of contact with a brake rotor during operation.

20. The brake pad of claim 11, wherein the composite comprises at least two materials selected from a list including inorganic resin, organic resin, sodium silicate, polyblend non-sanded grout, zirconia, zircon, barytes, antimony trisulfide, magnetite, and potassium titanate.

* * * * *